(12) United States Patent
Werner

(10) Patent No.: US 7,401,873 B2
(45) Date of Patent: Jul. 22, 2008

(54) METHOD FOR PREVENTING A STATIONARY VEHICLE FROM UNINTENTIONALLY ROLLING

(75) Inventor: Erwin Werner, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 192 days.

(21) Appl. No.: 10/527,476

(22) PCT Filed: Sep. 16, 2003

(86) PCT No.: PCT/EP03/10275

§ 371 (c)(1),
(2), (4) Date: Mar. 11, 2005

(87) PCT Pub. No.: WO2004/028876

PCT Pub. Date: Apr. 8, 2004

(65) Prior Publication Data
US 2006/0152079 A1    Jul. 13, 2006

(30) Foreign Application Priority Data
Sep. 21, 2002  (DE)  ............... 102 44 024

(51) Int. Cl.
*B60T 8/32* (2006.01)
(52) U.S. Cl. ............... 303/191; 188/DIG. 2; 192/13 A
(58) Field of Classification Search ........... 303/191; 188/DIG. 2; 192/3.63, 218, 13 A, 13 R
See application file for complete search history.

(56) References Cited

U.S. PATENT DOCUMENTS

| | | | | |
|---|---|---|---|---|
| 4,515,259 A | * | 5/1985 | Ha | 477/198 |
| 4,666,021 A | * | 5/1987 | Messersmith | 188/331 |
| 4,667,471 A | * | 5/1987 | Fulmer et al. | 60/545 |
| 4,681,196 A | * | 7/1987 | Fulmer et al. | 477/198 |
| 4,921,082 A | * | 5/1990 | Kang et al. | 192/13 A |
| 5,066,077 A | * | 11/1991 | Farr | 303/114.1 |
| 5,137,127 A | * | 8/1992 | Braun | 477/195 |
| 5,265,945 A | * | 11/1993 | Yamashita et al. | 303/144 |
| 5,372,409 A | * | 12/1994 | Farr | 303/20 |
| 5,692,990 A | * | 12/1997 | Tsukamoto et al. | 477/93 |
| 6,039,673 A | * | 3/2000 | Mikami et al. | 477/93 |
| 6,260,934 B1 | * | 7/2001 | Lee | 303/192 |
| 6,315,372 B1 | | 11/2001 | Kröger et al. | |
| 6,411,881 B1 | * | 6/2002 | Thomas | 701/67 |
| 2003/0214185 A1 | | 11/2003 | Kinder et al. | |
| 2004/0043868 A1 | | 3/2004 | Ewinger et al. | |

FOREIGN PATENT DOCUMENTS

| | | |
|---|---|---|
| DE | 35 07 330 A1 | 9/1986 |
| DE | 198 48 448 C2 | 12/2001 |
| DE | 101 51 846 A1 | 5/2002 |
| DE | 100 61 006 A1 | 6/2002 |
| DE | 100 63 063 A1 | 6/2002 |
| DE | 101 05 749 A1 | 8/2002 |
| WO | WO-97/16333 | 5/1997 |

* cited by examiner

*Primary Examiner*—Robert A. Siconolfi
*Assistant Examiner*—Mariano Sy
(74) *Attorney, Agent, or Firm*—Davis Bujold & Daniels, P.L.L.C.

(57) ABSTRACT

A method for preventing a stationary vehicle from unintentionally rolling away. The transmission is not in a neutral position. By activating a brake, a holding mode is actuated whereby a brake is released, dependent upon the displacement of a clutch, which determines the actual takeover torque of the clutch and the holding mode can be deactivated.

3 Claims, 1 Drawing Sheet

METHOD FOR PREVENTING A STATIONARY VEHICLE FROM UNINTENTIONALLY ROLLING

This application is a national stage completion of PCT/EP2003/010275 filed Sep. 16, 2003 which claims priority from German Application Serial No. 102 44 024.7 filed Sep. 21, 2002.

FIELD OF THE INVENTION

The invention concerns a method and a device to prevent a stationary vehicle from unintentionally rolling away.

BACKGROUND OF THE INVENTION

Many methods and devices conforming to the state of the technology are known for the prevention of a stationary vehicle unintentionally rolling away, which exhibit different ways of preventing a vehicle from rolling away.

For example, DE 101 51 846 A1 discloses a method and a device for the prevention of an unintended rolling away of a stationary vehicle, wherein a driver is enabled to very simply deactivate the pressure to a holding brake, which brake performs the desired function. In doing this, first, in the case of a stationary vehicle, a holding mode is initiated upon the activation of a brake pedal in which at least one wheel brake apparatus of the vehicle is controllingly commanded to produce a braking force so that the vehicle is automatically held fixed from further movement and cannot inadvertently roll away. This holding mode can also be deactivated by a second activation of the brake pedal.

In the case of a secure braking of the vehicle on an incline by way of the described method and in accordance with the state of the technology, a dangerous situation can arise if the driver leaves the driver's seat with the presupposed idea that the vehicle is securely braked by the augmented startup gearing. In the case of a fault in this described holding method, it is possible that a reverse rolling of the vehicle could occur, especially when a clutch is not, as expected, fully closed. Further, it is necessary for the driver to activate this holding function by way of repeated pressings of continually increasing force on the brake pedal, which brings about an additional safety risk.

The present invention has the purpose of presenting a method and a device for preventing a stationary vehicle of unintentionally rolling away, which is immediately activated upon the stopping of the vehicle and, which invented method and device, allow the activation of a holding function without excessive technical involvement even in a case of a fault (as cited above) in the startup gearing, such as an unexpected failure of a clutch to close.

The purpose of the invention is achieved by a generic method and a device for the prevention of a stationary vehicle to inadvertently roll away.

SUMMARY OF THE INVENTION

By using a clutch displacement as a characteristic value to serve as a determinant for an actual torque takeover by a clutch, which procedure can also be automatic, it is possible that the brakes release themselves, in accordance with a specified release criterion. The threshold of release can be set independently of vehicle and driving criteria, such as the weight of the vehicle or the incline of the parking surface. In this operation, the brakes release as soon as the clutch displacement oversteps a predetermined threshold value. Dependent upon the operational condition, such as during startup or when maneuvering, the predetermined threshold values can be so fixed that the release criterion can function optionally in any state of operation. By way of this interaction, assurance may be guaranteed that the vehicle does not roll away in a reverse direction, when the holding function is deactivated. Furthermore, it is among the advantages of the present invention that the holding function remains secure, even in a case of an eventual fault in the startup gearing, which would lead to a situation wherein the clutch has not been (as was expected) closed, although the clutch pedal was activated. The existing brake system pressure can be increased at any time by way of a non-return check-valve. In addition, a light pressure on the brake pedal suffices in assuring that the vehicle is securely immobilized. In order to cope with a situation wherein a driver leaves the vehicle when the holding brake has not been activated, it is possible that the holding function can be augmented with a specified time-delay period. Thereby, the brake can be released even when, for a known predetermined time period, no foot pedal has been activated. This time period would be advantageously so adjusted that the vehicle driver cannot not leave the vehicle unless the brake had not been previously released and thereby the vehicle would slowly roll backwards. Subsequently, if a stopped condition of the vehicle is made known and the transmission is not in the neutral position and the brake pedal is pressed, then the controlled brake pressure will maintain itself for a period following the release of the brake pedal until the clutch has reached a specified position. If, after the release of the brake pedal, the accelerator pedal is not activated, then the brake releases after a specified time period.

The holding function can exert control both by way of a valve with a digitally controlled outlet and also generate a CAN-data delivery which, by way of an appropriately equipped EBS system, is interpreted and acted upon. The recognition as to whether or not such a system is present and the associated selection of the input and output values can be done automatically. In order to achieve the greatest possible comfort upon the release of the brake, the exact moment of the holding period can be determined in order to avoid a release-jump and to prevent the vehicle from rolling backwards, which can occur if the brake is released too early. For this purpose, particular driving resistances are input into the transmission control, which would include the characteristic values of the actual vehicle weight and the degree of the current incline of the road surface. The necessary holding moment for that torque can be computed from these values.

Since the clutch displacement is proportionally related to the transition time, the brakes can be released by the electronic control at precisely that point when6 the clutch attains the necessary torque which is required to hold the vehicle at the actual incline. Since all necessary data is already in the transmission control, this embodiment of the invention can be produced without added sensors and, therefore, in an economical manner.

BRIEF DESCRIPTION OF THE DRAWING

The invention will now be described, by way of example, with reference to the accompanying drawings in which.

DETAILED DESCRIPTION OF THE INVENTION

Figure 1:
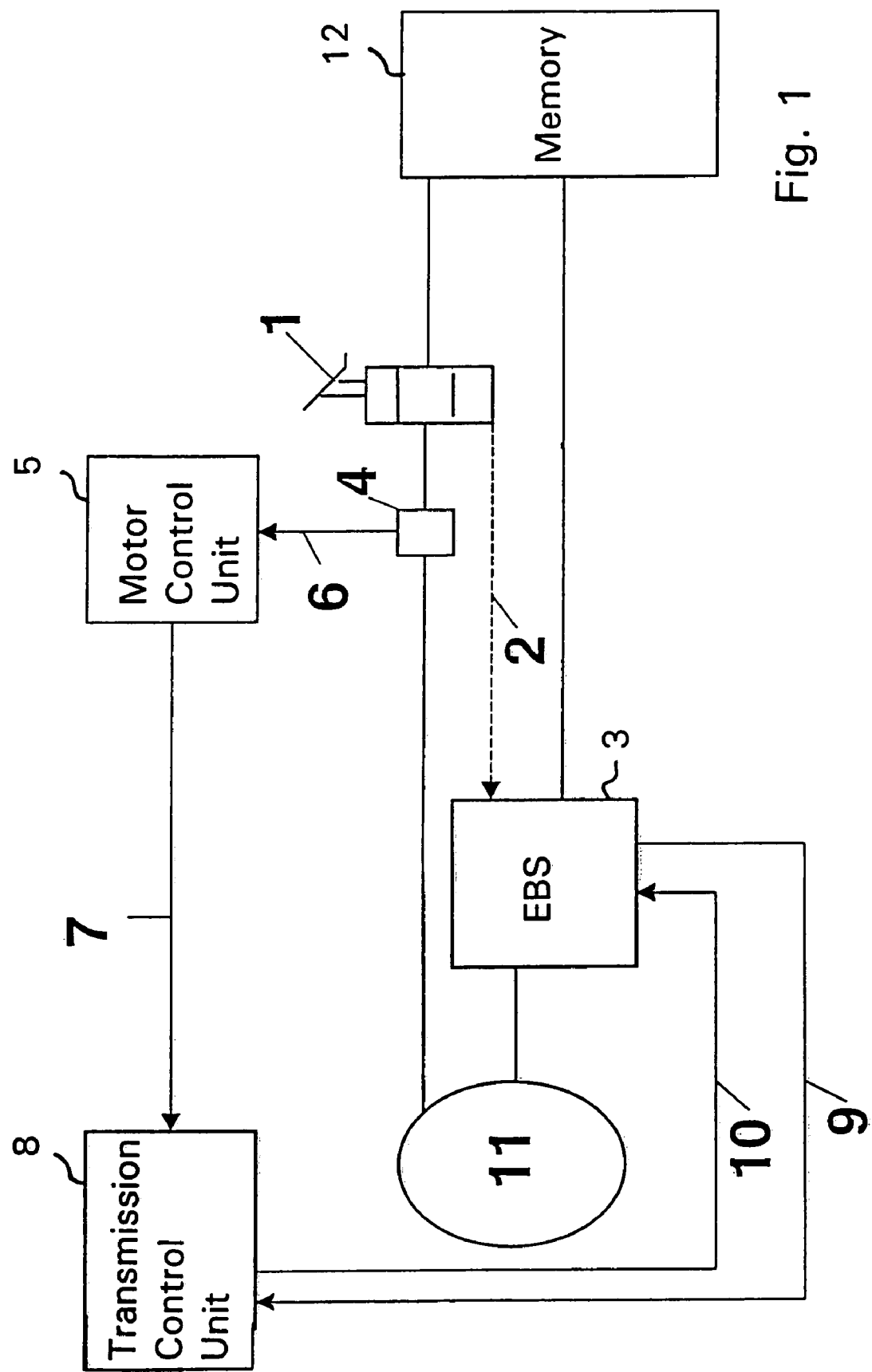
FIG. 1 is a schematic representation of an invented method and device for preventing a stationary vehicle from unintentionally rolling away.

This single FIGURE shows a schematic presentation of an invented method and also an invented device for preventing a stationary vehicle from unintentionally rolling away using an EBS 3. When a brake pedal 1 is activated, then the brake pedal position 2 is transferred to an EBS 3. By way of a stoplight switch 4, a motor control unit 5 forwards a signal 6 as a CAN-signal 7 to a transmission control unit 8. In addition, simultaneously from the same EBS 3, via a CAN-signal 9, the position of a brake pedal 1 is sent to the transmission control unit 8. The transmission control unit 8 sends a signal 10 back to the EBS 3 for the activation of a holding mode and a brake 11 can be altered via brake-pressure. In a supplementary brake circuit, it is possible that the brake 11 can also be activated by a memory 12 via activating the brake pedal 1.

REFERENCE NUMERALS

1 brake pedal
2 brake pedal position
3 EBS
4 stoplight switch
5 motor control unit
6 signal
7 CAN-signal
8 transmission control unit
9 CAN-signal
10 CAN-signal
11 brake
12 memory

The invention claimed is:

1. A method of preventing unintentional rolling of a stationary vehicle having an automated transmission and a clutch, the method comprising the steps of:
    activating a brake pedal, when the vehicle is stationary and the transmission is not in a neutral position, and in response to activation of the brake pedal, activating a brake holding mode to maintain the vehicle stationary,
    deactivating the brake pedal,
    determining a displacement of the clutch wherein the displacement of the clutch is determinative of a torque transmitted through the clutch, and
        when the clutch displacement indicates that the torque transmitted through the clutch is at least a takeover torque which is sufficient to prevent rolling of the vehicle, deactivating the brake holding mode, and
        when the clutch displacement indicates that the torque transmitted through the clutch is less than the takeover torque, and the brake pedal is not reactivated within a timing delay period after the activation of the brake pedal, deactivating the brake holding mode for a predetermined time period which permits a rolling of the vehicle during the predetermined time period.

2. The method according to claim 1, further comprising the step of using the brake holding mode to both control a valve by way of a digital output and generate a CAN-signal (10).

3. The method according to claim 1, further comprising the step of determining a characteristic value by a transmission control unit (8), which deactivates the brake holding mode in accordance with specifics of the vehicle and only releasing the brake holding mode if the clutch can attain the sufficient takeover torque.

* * * * *